Nov. 25, 1952 E. O. BLODGETT 2,619,532

TAPE READER

Filed July 12, 1950 6 Sheets-Sheet 1

INVENTOR.
EDWIN O. BLODGETT
BY Robert S. Dunham

Nov. 25, 1952 E. O. BLODGETT 2,619,532

TAPE READER

Filed July 12, 1950 6 Sheets-Sheet 2

INVENTOR
EDWIN O. BLODGETT
BY Robert S. Dunham
ATTORNEY

Nov. 25, 1952

E. O. BLODGETT 2,619,532

TAPE READER

Filed July 12, 1950

6 Sheets-Sheet 3

INVENTOR
EDWIN O. BLODGETT
BY Robert S. Dunham
ATTORNEY

INVENTOR.
EDWIN O. BLODGETT
BY Robert S. Dunham

Nov. 25, 1952 E. O. BLODGETT 2,619,532

TAPE READER

Filed July 12, 1950 6 Sheets-Sheet 5

INVENTOR.
EDWIN O. BLODGETT

BY Robert S. Dunham

Nov. 25, 1952 E. O. BLODGETT 2,619,532

TAPE READER

Filed July 12, 1950 6 Sheets-Sheet 6

INVENTOR
EDWIN O. BLODGETT
BY Robert S. Dunham
ATTORNEY

Patented Nov. 25, 1952 2,619,532

UNITED STATES PATENT OFFICE 2,619,532

TAPE READER

Edwin O. Blodgett, Rochester, N. Y., assignor to International Business Machines Corporation, New York, N. Y., a corporation of New York Application July 12, 1950, Serial No. 173,320

3 Claims. (Cl. 178—17)

This invention relates to a device for reading perforated record tapes, and for completing electrical circuits in accordance with perforations in such tapes.

Certain classes of automatic accounting, computing and statistical machines utilize a control tape having either alphabetical or numerical data, or both, punched therein in coded form. Such tapes are read in reading devices of the class to which this invention relates by means of reading pins that are reciprocated into the tape perforations present at a tape reading station. Control of analyzing and translating circuits which control certain elements of the accounting, computing and statistical machinery is thereby obtained. Heretofore the tape reading devices, and particularly the reading pins thereof, have operated with some degree of uncertainty, and in particular such pins have had a tendency to damage the control tape by reason of the fact that they have operated on such tape with considerable pressure.

It is, therefore, an object of this invention to provide a tape reading device which has perforation reading pins that operate in a positive and certain fashion, yet with such slight pressure on the control tape that all tape damage as a result of pin contact is avoided.

It is a further object of the invention to provide a tape reading device which is under positive control at each reading step. To this end there is provided certain tape feeding and tape reading latch mechanism under control of a single control device, thereby insuring synchronous operation of tape reading and feeding mechanism.

Other objects and advantages of the invention will appear as a reading of the specification proceeds in light of the drawings in which.

*Tape controlled contacts*

Figure 1:
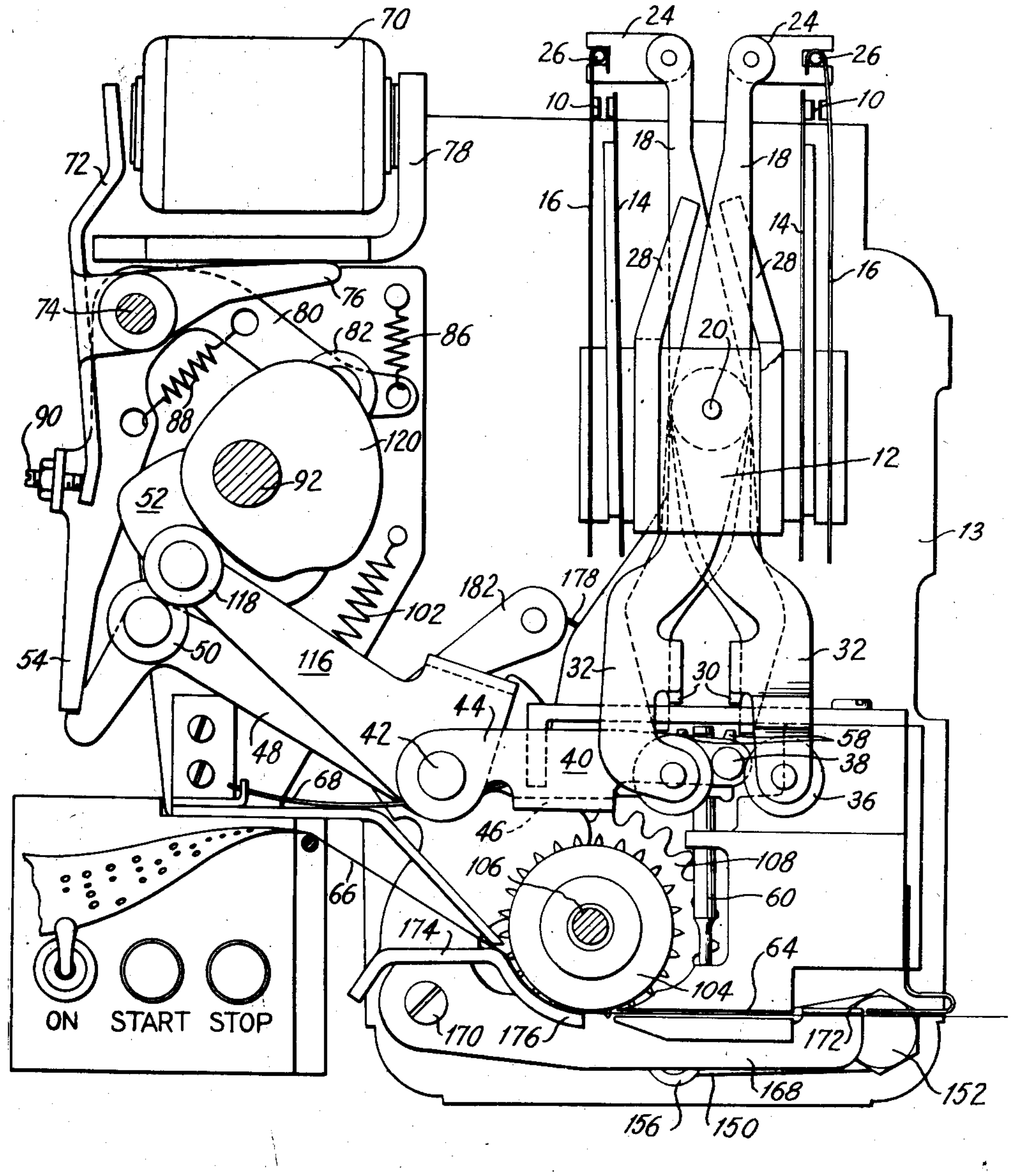
Fig. 1 is a plane view of the tape reading mechanism.
Figure 2:
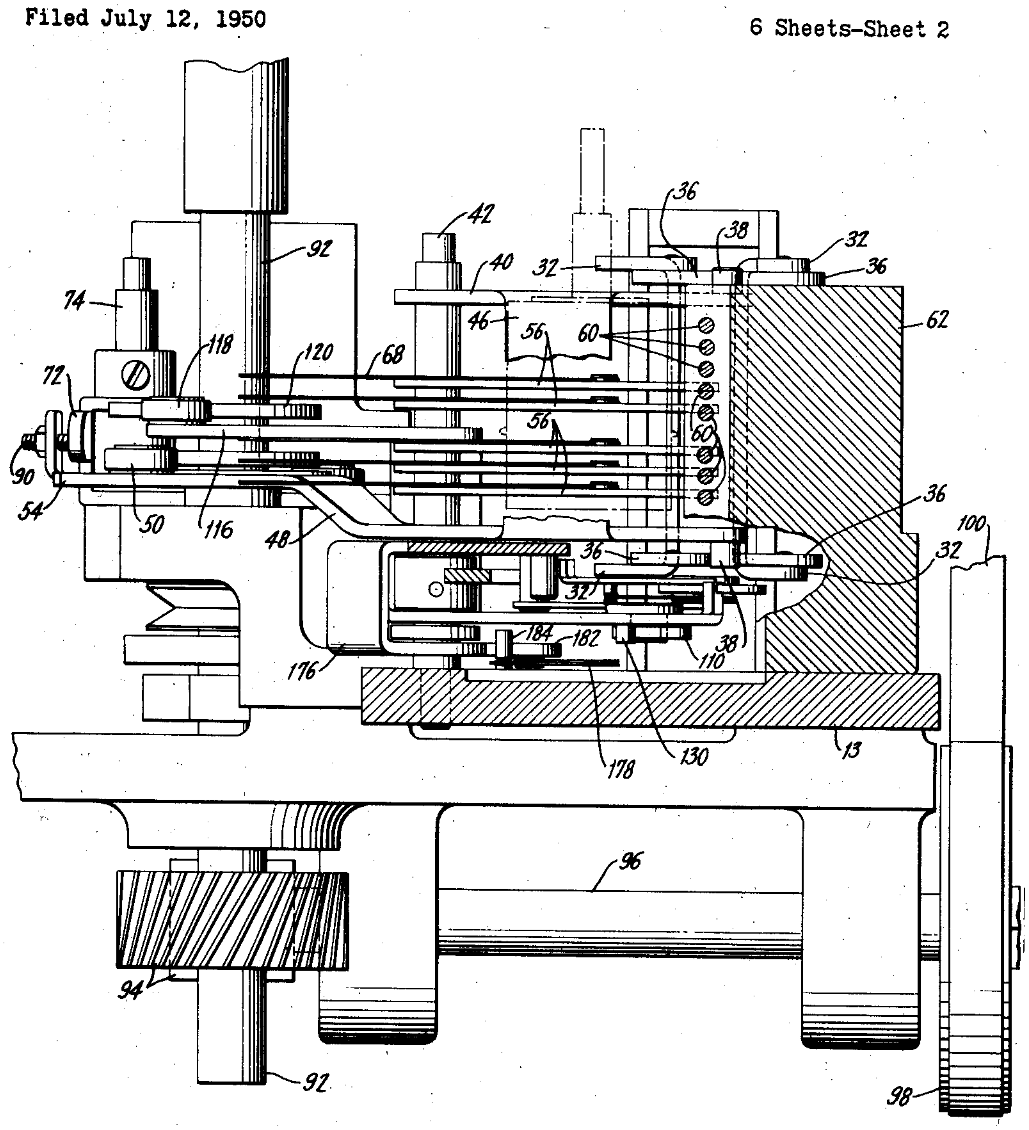
Fig. 2 is a front, elevational view of the tape reading mechanism with portions broken away to show underlying structure.
Figure 3:
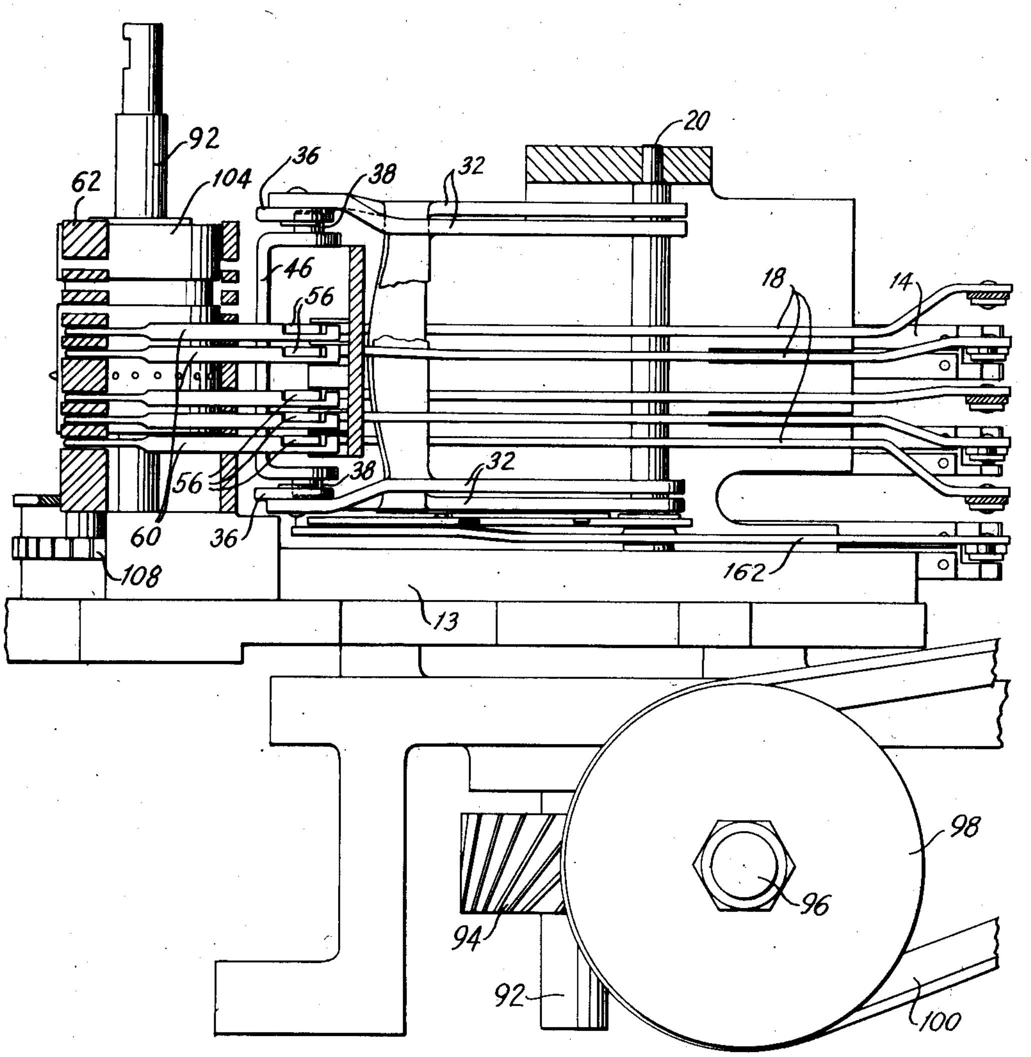
Fig. 3 is a side elevational view of the reading mechanism with portions broken away to show underlying structure.

As hereinbefore stated the invention relates to perforated tape controlled circuit making and breaking mechanism, and accordingly there are included a plurality of paired electrical contacts 10 which are disposed in opposite rows on a supporting structure 12 which is mounted on a base casting 13. Inasmuch as the present device is designed to sense any one of eight holes, or any combination thereof, in the control tape there are eight contacts under the control of tape perforations and a ninth contact constituting a tape run-out contact which will be described in greater detail hereinafter. The contacts in the oppositely disposed rows are arranged on the supporting structure 12 in staggered relation so that they may be individually controlled by interposer mechanism which will be more fully described at a later point.

Each contact device consists of a fixed conducting strip 14 on one end of which is a contact point, and a resiliently movable conducting strip 16 which carries a contact point in registration with the one on the fixed strip 14 with which it is paired. The resilient conducting strip 16 is normally biased to close the contact points. Each contact device, however, is held open, except when a corresponding tape perforation appears, by means of an offset contact lever 18 which is mounted for limited swinging movement on a pivot shaft 20 which forms part of the supporting structure 12. Each of the contact levers 18 has a free end 22 which when moved outwardly causes the contact operating end thereof to move outwardly. The contact operating end of each lever has pivoted thereto a short, outwardly extending projection 24 which is notched to engage an upwardly extending section 26 of the associated resilient contact strips 16. As a result of this structure, when the lower free ends 22 of the contact levers 18 are moved outwardly the upper ends move outwardly, whereby the contact points on the associated circuit maker are opened.

The contact levers 18 are guided in their movement by a pair of guide combs 28, and the movement of these levers is partially under control of a pair of contact lever bails 30, one such bail being associated with each row of contact levers, which are adapted to engage the lower free ends 22 of the contact levers. Thus, when the contact lever bails 30 are moved toward each other, any contact lever which is at such time otherwise free will permit its associated resilient conducting strip 16 to move inwardly to close the contacts thereof. The contact lever bail assembly includes a pair of yoke-like members 32, each comprised of a pair of spaced straps 34 interconnected by the contact lever bail 30. One end of each strap is pivoted on the pivot shaft 20, and the other end of each has mounted thereon a roller 36. The contact lever bail assemblies are interconnected by a spring (not shown) whereby they are urged toward each other, but they are kept in normally separated position by means of interposer bail studs 38 which are adapted to move between the rollers 36 at each end of the assembly. When the studs 38 are disposed between the rollers 36, the contact lever bail assembly is separated, the contact lever bails 30 are in contact with the free ends 22 of the contact levers 18, and as a consequence the contact points of the circuit makers are opened.

The studs 38 are carried by an interposer bail assembly 40 which in turn is pivoted on a pivot shaft 42. The interposer bail assembly 40 includes a pair of spaced side arms 44 on the free end of each of which is located a stud 38 and from which it projects into position between the rollers 36. An interposer bail 46 interconnects the side arms 44 of the interposer bail assembly, and this bail is adapted to underlie and to control a series of interposers as will more fully appear hereinafter. Furthermore, the interposer bail assembly has attached thereto an interposer bail arm 48 by means of which the forwardly projecting arms 44 may be rocked about the pivot shaft 42 on which they are mounted. The free end of the interposer bail arm 48 has a cam follower 50 mounted thereon adapted to operate in contact with an interposer bail cam 52 when the interposer bail arm 48 is released from the influence of a control arm 54, as will be more fully explained hereinafter.

Figure 6:
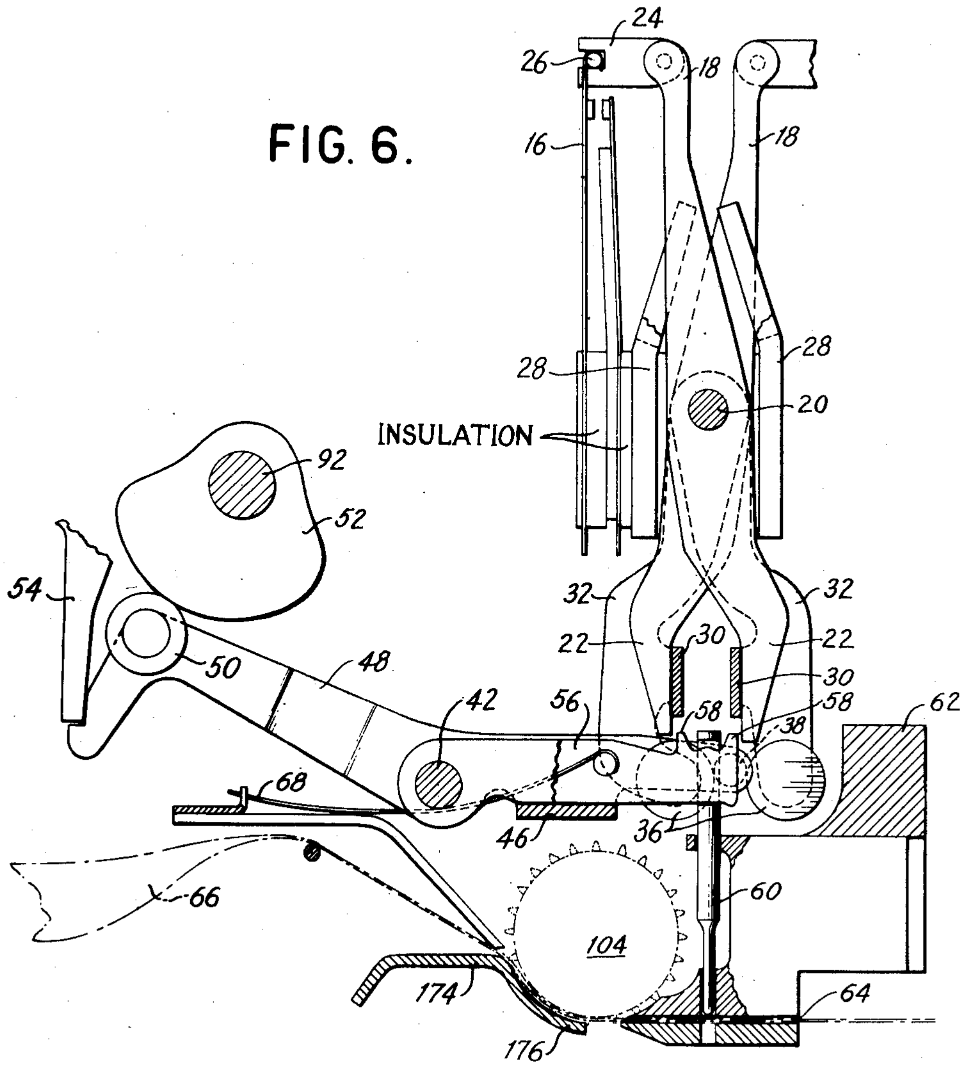
Fig. 6 is a detail view of the tape guide means, reading pins and contact mechanism.

The operation of the tape controlled contact assembly is under the ultimate control of a series of interposer arms 56 and attached tape reading pins, one such arm being provided for each tape controlled contact lever. As best seen in Fig. 6 of the drawings the interposer arms 56 are freely pivoted on the shaft 42 on which they are mounted, and each consists of a lever having a pair of interposer shoulders 58 formed at the free end thereof. One shoulder 58 of each interposer arm will be associated with the free end 22 of its corresponding contact lever. In the inoperative or non-reading position of the device, the interposer arms will be positioned as shown in Fig. 6 of the drawings with one of its shoulders 58 in blocking or interposed relation with its associated contact lever. It will be seen, therefore, that even though the contact lever bails 30 are released, any contact lever whose interposer arm 56 is in blocking position will be restrained from movement and consequently its associated contacts will remain open.

Depending from each interposer arm is a reading pin 60 which is guided for reciprocating movement in a reading pin guide block 62. The path of the reading pins 60 intersects a tape feed throat 64 in the guide block 62. As a perforated tape 66 is fed through the tape feed throat 64, the reading pins 60 are in light contact therewith by reason of the fact that each interposer arm 56 is under the influence of a light spring 68. The tension of the spring 68 is insufficient to cause any damage to a control tape being read. However, the spring tension is sufficient to cause a reading pin 60 to enter a tape perforation in alignment therewith at the reading station. When this relationship is present the corresponding pin 60 will enter the tape perforation, causing the interposer arm 56 to swing on its pivot shaft 42 sufficiently to withdraw the blocking interposer shoulder 58 from the path of its associated contact lever. Under these conditions when the contact lever bails 30 are moved inwardly away from the free ends 22 of the contact levers, a contact lever thus freed will move sufficiently to close its associated contact points. In the absence of a perforation in the tape, the reading pins will rest lightly on the surface thereof, thus preventing the associated interposer arms 56 from moving out of the path of their associated contact levers, thereby blocking the levers against movement and avoiding the operation of their associated contacts. Whenever the interposer bail 46 is in its elevated position, the interposer arms 56 will be held in non-reading position. It will be noted in Fig. 6 that the interposer bail 46 underlies and is adapted to contact the bottom edge of the aligned interposer arms.

*Control clutch*

Figures 4, 5:
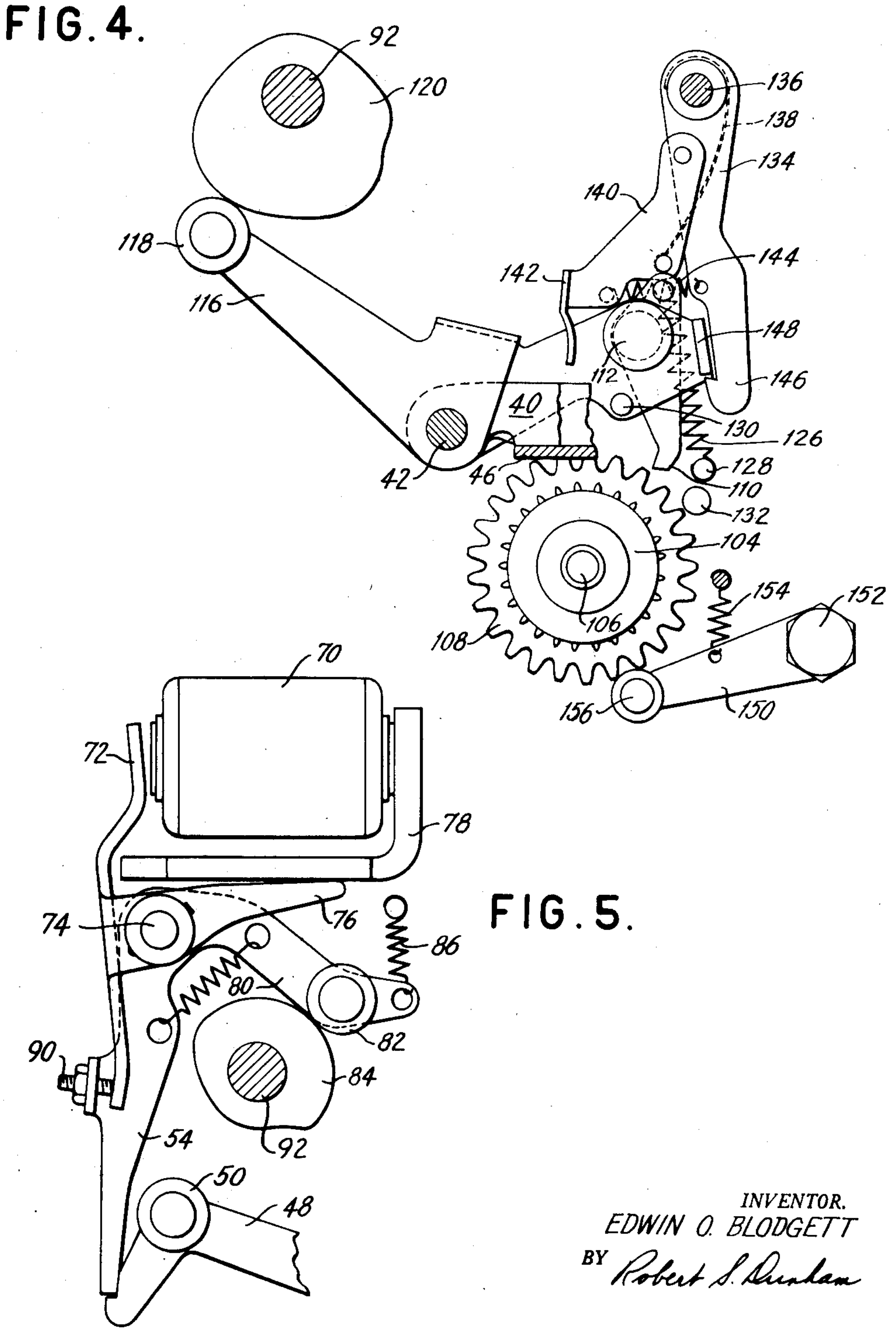
Fig. 4 is a detail view of the tape feeding mechanism.
Fig. 5 is a detail view of the control magnet and associated control mechanism.

The interposer arms 56 and consequently the reading pins 60 are retained in non-reading position by the interposer bail 46 until the interposer bail arm 48 is released by the control arm 54. Such release follows energization of a control magnet 70 (see Fig. 5) in connection with which operates an armature 72 which is pivoted on a stud shaft 74 and about which the armature may rock. The control arm 54 is likewise pivoted on the stud shaft 74. The armature 72 is a bifurcated structure having a laterally extending stop finger 76 adapted to limit its rocking movement about the shaft 74 by contact with an armature yoke 78. A second extension 80 of the armature structure lies substantially parallel but in spaced relation in respect to the stop finger 76, and the free end of this latter extension mounts a cam following roller adapted to contact an armature knock-off cam 84. A spring 86 normally biases the armature 72 away from the core of the control magnet 70, but in order to render the action of the armature 72 positive in overcoming residual magnetism in the core 70, the armature knock-off cam 84 is arranged to positively rock the armature away from the core immediately after the energizing impulses. The conjoint action of the control arm 54 and the armature 72 is achieved by the use of an interconnecting spring 88 (Fig. 1) and the relative adjustment of the two members is achieved through an adjusting screw 90 mounted in a flange of the control arm in such position as to contact the free end of the armature.

The interposer cam 52 and the armature knock-off cam 84 as well as a tape feed cam, as will appear hereinafter, are mounted for rotation with a power shaft 92 which is driven through a set of bevelled gears 94 from a driven shaft 96. The driven shaft has a pulley 98 fixed to one end thereof for driving contact by belt 100, which is driven by a motor (not shown). The power shaft 92 and consequently the cams thereon are continuously rotated but tape reading operations are not performed until the control magnet 70 is energized. When an energizing current is present in the control magnet 70, the armature 72 is attracted to the magnet core with the result that the control arm 54 is rocked in a clockwise direction, thereby releasing the interposer bail arm 48. The interposer bail arm 48 is under the influence of a spring 102 (Fig. 1) which is effective to draw the cam follower 50 of the interposer bail arm into contact with the interposer bail cam 52. As the interposer bail cam 52 rotates, the interposer bail arm 48 rocks about the pivot shaft 42 and drops the interposer bail assembly 40. As a result of this action the interposers 56 are permitted to drop under the influence of their respective springs 68, and the reading pins 60 will enter any tape perforations that are presented in alignment with the respective pins. When one or more of the pins enters a perforation in the tape, the interposer 56 associated therewith drops sufficiently to free the interposer shoulder 58 from blocking engagement with its associated contact lever 18 so that when the interposer studs 38 move from between the contact lever bail rollers 36, the contact lever, or levers, thus freed of the interposer shoulders will move inwardly under the influence of the resilient contact strip 16 and permit contacts of such operated contact lever, or levers, to close.

As the interposer bail cam 52 rotates and its high point rides in contact with the interposer bail cam follower 50 the interposer bail arm assembly is rocked in a counterclockwise direction about its pivot shaft 42 and the control arm 54 is moved inwardly under the influence of the spring 88 (Fig. 1) so as to be in position to intercept the latch end of the interposer bail arm 48 as it rises, thereby holding it out of further contact with the interposer bail cam 52 and sustaining it against the influence of the spring 102. In this position the reading mechanism will again be latched, the interposer bail 46 having raised the interposer arms 58 into contact lever blocking position and the contact levers having been separated by contact with the contact lever bails 30 upon separation of the contact lever bail assembly structure by the interposer bail studs 38. A second tape reading operation cannot follow, therefore, until the control magnet 70 is once again energized.

*Tape feed*

The perforation in the tape are arranged in transverse rows that are equally spaced, and it is contemplated, therefore, that as the tape is moved through the reading throat 64 in step-by-step progression, the successive rows of perforations will present themselves at the reading zone in alignment with the reading pins. For the purpose of achieving a regulated feeding of the tape through the reading zone there has been provided a tape feeding mechanism which is shown in detail in Fig. 4 of the drawings to which reference may now be had. The tape is provided along its length with sprocket holes with which the teeth of a pin wheel 104 are adapted to engage for feeding the tape through the reading throat 64. The pin wheel 104 is carried by a shaft 106 which is rotated in a bearing in the support casting 13 by a feed ratchet wheel 108. The feed ratchet wheel 108 has peripheral teeth which are periodically engaged by a feed pawl 110 for rotating the feed ratchet wheel as may be required for the proper feeding of the tape. The feed pawl 110 is pivoted on a stud 112 carried at one end of a feed pawl operating lever 114. The operating lever is mounted on its pivot shaft 42 for limited rocking movement thereabout and it includes a feed pawl operating arm 116 on the free end of which is mounted a cam follower 118 adapted to contact a tape feed cam 120 mounted for rotation with the power shaft 92. The feed pawl operating assembly includes a transverse tape feed yoke 122 extending between the feed pawl operating arm 116 and the extension 124 to which the feed pawl 110 is attached. The feed pawl 110 is moved through its feeding stroke by means of a relatively strong spring 126 which has one end thereof attached to the pawl and the other end thereof to a pin 128 fixed in the support casting 13. It will appear, therefore, that whenever the feed pawl operating assembly is free to rock about the pivot shaft 42, the end of the feed pawl 110 will be forced into operating engagement with the teeth of the feed ratchet wheel 108 under the influence of the operating spring 126.

A feed pawl stop 130 is carried by the feed pawl operating assembly extension 124 in such position as to limit the clockwise movement of the feed pawl 110. The support casing 13 carries a stop 132 which is positioned to limit the counterclockwise movement of the feed pawl 110. Between the two stops 130 and 132, the feed pawl 110 is therefore restrained to a predetermined path of movement as it functions to drive the feed ratchet wheel 108.

Restoration of the fed pawl 110 to inoperative position is under the influence of the tape feed cam 120. When the tape feed cam 120 rotates with its high point in contact with its cam follower 118, the feed pawl 110 is withdrawn to its inoperative position.

*Tape feed latch*

In order that the tape feed mechanism may be operative only when tape reading is desired, there has been provided a feed pawl latch 134 which is pivoted for rocking movement about a pivot shaft 136. The feed pawl latch 134 is urged to rock about its shaft 136 in a counterclockwise direction under the influence of a spring 138, but the same is normally held against such rocking movement by one of the contact lever bails 32.

Pivoted on the feed pawl latch 134 is a latch control lever 140 which has an extension 142 normally adapted to lie in contact with one of the contact lever bails 32. A spring 144 interconnects the feed pawl latch 134 and its control lever 140 so that clockwise movement of the control lever 140 imparted thereto by the contact lever bail 32 is transmitted to the feed pawl latch. The feed pawl latch has a hooked free end 146 adapted to engage under a shoulder 148 provided on the end of the feed pawl operating assembly finger 124.

It will appear, therefore, that as the feed pawl operating assembly is rocked into inoperative position under the influence of the tape feed cam 120, and as the contact lever bail 32 moves outwardly, the hooked end 146 of the feed pawl latch 134 will engage under the shoulder 148 and hold the feed pawl operating assembly in inoperative position. Upon the next succeeding tape reading operation the contact lever bails 32 will move inwardly, thereby releasing the control lever 140 and permitting separation of the feed pawl latch 134 and the shoulder 148 under the influence of the feed pawl latch spring 138. This will free the feed pawl operating assembly for a tape feeding operation. The timing of the respective parts is such that the reading of the perforations in the tape by the reading pins 60 takes place during the first part of the cycle and the feeding of the tape takes place during the latter part of the cycle.

A fed ratchet wheel detent 150 is pivoted on the support casting 13 by means of a pivot screw 152, and it is rocked in a clockwise direction under the influence of a spring 154 so that a roller 156 on the free end of the detent arm is in contact with the teeth of the feed ratchet wheel 108, thereby providing a stabilizing influence for the rotary operation of the feed ratchet wheel and consequently its associated tape feeding pin wheel.

*Tape run-out control*

Figure 7:
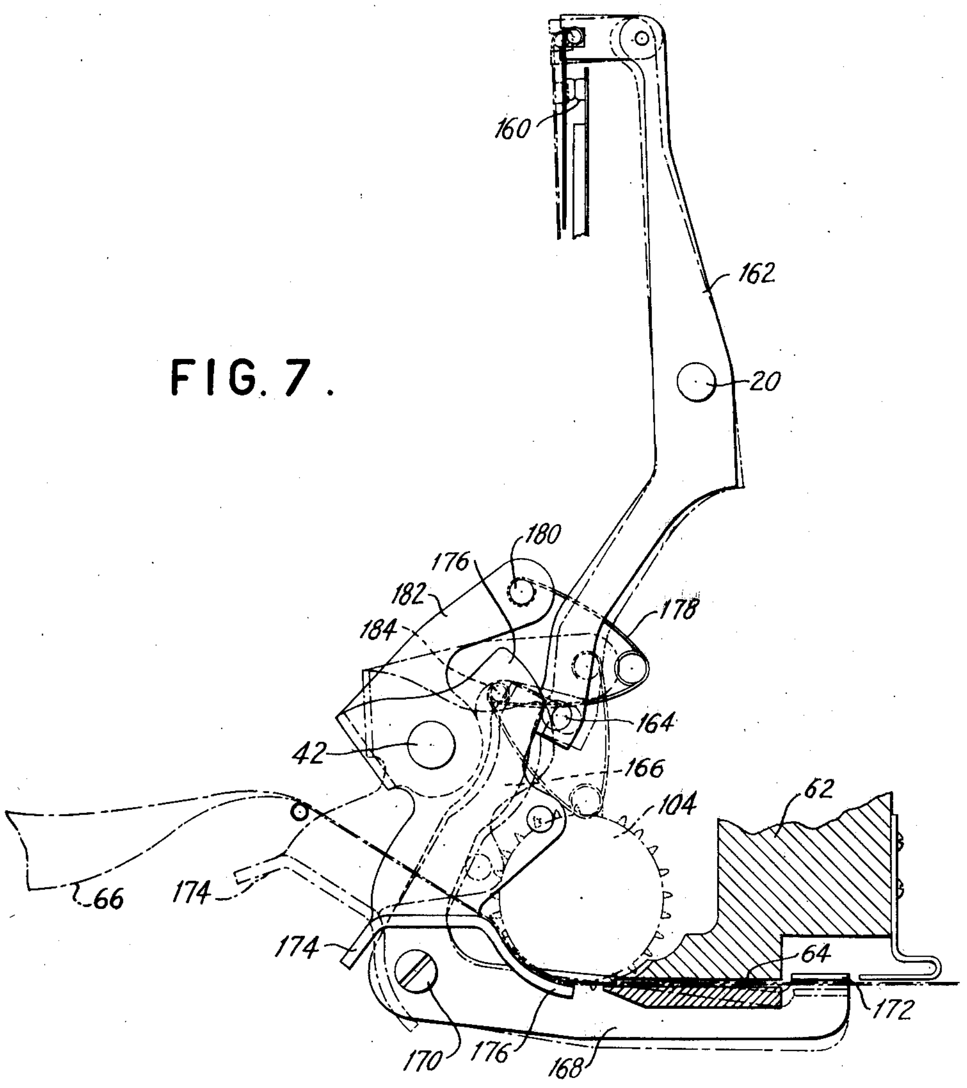
Fig. 7 is a detail view of the tape run-out contact and associated control mechanism.

In order to safeguard against the operation of the reading device in the absence of a tape there has been provided a tape run-out contact 160 which is solely under the control of a tape run-out contact lever 162. The supporting strips for the contacts 160 are mounted in fashion similar to the tape controlled contacts, and the tape run-out contact lever 162 is pivoted on the pivot shaft 20. During the normal operation of the machine the contacts 160 are closed as shown in the full line position in Fig. 7 of the drawings. The free end of the tape run-out contact lever 162 has a stud 164 extending laterally therefrom, and this stud lies in the path of the inner end 166 of an angular tape run-out arm 168 which is mounted for rocking movement about a pivot screw 170. The outer end of the tape run-out arm 168 has a laterally disposed finger 172 which in the normal operation of the device is adapted to rest on the inner surface of the tape at a point just beyond the tape throat 64. While supported by the tape, the tape run-out arm 68 is retained in such position that the inner end 166 of the arm merely bears against the tape run-out contact lever stud 164. The tape run-out arm is, however, spring-biased in a clockwise direction so that in the event of tape failure by reason of breakage or because of exhausted supply, the tape run-out arm will be rocked in a clockwise direction a sufficient distance to move the lower end of the tape run-out contact lever 162 in a counterclockwise direction to break the tape run-out contact 160. The tape run-out contact 160 may be in the main control circuit, and thereby upon opening thereof prevent further operation of the reading device until the tape supply has been restored.

In order that the tape may be held in cooperative relation with the pin wheel 104, there has been provided a tape hold-down arm 174 which has an arcuate surface 176 disposed in proximity to the pin wheel 104 and which serves the purpose of holding the tape in contact with the feed pins of the pin wheel.

In order that threading of the tape may be facilitated, the tape hold-down arm 174 is pivoted for rocking movement on its pivot shaft 42. By virtue of the pivotal mounting of the tape hold-down arm, it may be rocked away from the pin wheel 104 into the dotted line position shown in Fig. 7, thereby exposing the pin wheel to facilitate threading of the tape thereabout.

It is, of course, desirable that the tape run-out contact be opened and retained in open position while the tape hold-down arm 174 has been rocked away from the pin wheel 104 and to the end that the contact 160 may be opened and held against inadvertent closure during tape threading operations, there has been provided a camming surface 176 on an inwardly projecting portion of the tape hold-down arm. The camming surface 176 is so disposed in relation to the tape run-out contact lever stud 164 that rocking thereof, as in the open position of the tape hold-down arm, it will contact the stud 164 and move the lower end of the tape run-out contact lever 164 in a counterclockwise direction, thus opening the contacts 160.

In order that the tape hold-down arm be somewhat positively held in both its open and in its closed position, there is provided a spring loop 178 which has one end thereof attached to a stud 180 extending from the face of an extension finger 182 forming part of the tape hold-down arm assembly. The other end of the spring loop is attached to a stud 184 fixed in and extending from the base casting 13. When the tape hold-down arm is in its closed position, as shown in full lines in Fig. 7, the spring bow 178 exerts a counterclockwise force against the extension finger 182 and thereby moves the arcuate portion 176 of the tape hold-down arm against the pin wheel 104. When the tape hold-down arm is swung into the open position, as shown in dotted lines in Fig. 7, the spring bow 178 tends to force the extension finger 182 in a clockwise direction, thus tending to hold the tape hold-down arm in its open position.

It will appear from the foregoing, therefore, that the tape controlled contacts 10 are permitted to close when a tape reading pin 60 associated with a contact lever 18 enters a perforation in the tape 66. The aggregate force of the resilient contact strips 16 is considerable, and it will follow from the foregoing description and explanation that the interposer structure sustains this force and avoids transmission thereof to the reading pins; even though the reading pins are the ultimate control instrument for the pin controlled contacts, there is only the weight of the pin, its interposed finger and the force of the interposer spring 68 imposed on the reading pin 60 with the result that the reading pins offer no obstruction to the even passage of the tape through the reading zone. The tape may consequently be used repeatedly without fear of damage or undue wear by contact with the reading pins.

An effort has been made to describe the operation of the various subcombinations of the reading device as the description thereof proceeded. It is believed, therefore, that a summary description of the operation has been rendered unnecessary.

Having thus described my invention, I claim:

1. In a reading device for perforated control tape, a circuit maker including a spring contact effective when unrestrained to close its circuit, a pivot shaft, a control lever for said spring contact mounted between its ends on said pivot shaft for rocking movement thereabout, a connection between one end of said control lever and said spring contact, a control lever bail mounted on said pivot shaft for normally holding said control lever in circuit opening position against the tension of said spring contact, an interposer mounted at one end thereof for movement into and out of blocking relation with said control lever, a perforated tape reading pin mounted at the other end of said interposer, means for moving said pin into a tape perforation whereby said interposer is moved out of blocking relation with said control lever, an interposer bail assembly mounted for rocking movement into and out of restraining relation with said control lever bail, an interposer restoring bail carried by said interposer bail assembly, a continuously rotating cam for rocking said interposer bail assembly about its mounting, a latch for holding said interposer bail assembly out of operative contact with said cam, and means for releasing said latch whereby said cam is rendered effective to rock said interposer bail assembly.

2. In a reading device for perforated control tape, a plurality of circuit makers each including a spring contact effective when unrestrained to close its circuit, a pivot shaft, a control lever for each of said spring contacts mounted between their ends on said pivot shaft for rocking movement thereabout, a connection between one end of each of said control levers and a related spring contact, a common control lever bail mounted on said pivot shaft for normally holding said control levers in circuit opening position against the tension of said spring contacts, an individual interposer mounted at one end thereof for movement into and out of blocking relation with each of said control levers, a perforated tape reading pin mounted at the other end of each of said interposers, means for moving said pins into tape perforations whereby their related interposers are moved out of blocking relation with their associated control levers, an interposer bail assembly mounted for rocking movement into and out of restraining relation with said control lever bails, a common interposer restoring bail carried by said interposer bail assembly, a continuously rotating cam for rocking said interposer bail assembly about its mounting, a latch for holding said interposer bail assembly out of operative contact with said cam, and means for releasing said latch whereby said cam is rendered effective to rock said interposer bail assembly.

3. In a reading device for perforated control tape, a pair of spaced oppositely disposed circuit makers each including a spring contact effective when unrestrained to close its circuit, a pivot shaft, a control lever for each of said spring contacts mounted between their ends on said pivot shaft for rocking movement thereabout, a connection between one end of each of said control lever and a related spring contact, a control lever bail for each of said control levers mounted on said pivot shaft for normally holding said control levers in circuit opening position against the tension of the spring contacts connected thereto, an independent interposer mounted at one end thereof for movement into and out of blocking relation with each of said control levers, a perforated tape reading pin mounted at the other end of each of said interposers, means for moving said pins into tape perforations whereby said interposers are moved out of blocking relation with their associated control levers, an interposer bail assembly, common control means on said interposer bail assembly adapted to contact said control lever bails for operation thereof, means mounting said interposer bail assembly for rocking movement into and out of restraining relation with said control lever bails, an interposer restoring bail carried by said interposer bail assembly, and means for rocking said interposer bail assembly about its mounting.

EDWIN O. BLODGETT.

REFERENCES CITED

The following references are of record in the file of this patent:

UNITED STATES PATENTS

| Number | Name | Date |
|---|---|---|
| 1,895,110 | Sundberg | Jan. 24, 1933 |
| 2,391,984 | Lake | Jan. 1, 1946 |